(12) United States Patent
Bahrami et al.

(10) Patent No.: US 11,368,358 B2
(45) Date of Patent: Jun. 21, 2022

(54) AUTOMATED MACHINE-LEARNING-BASED TICKET RESOLUTION FOR SYSTEM RECOVERY

(71) Applicant: FUJITSU LIMITED, Kawasaki (JP)

(72) Inventors: Mehdi Bahrami, San Jose, CA (US); Wei-Peng Chen, Fremont, CA (US)

(73) Assignee: FUJITSU LIMITED, Kawasaki (JP)

( * ) Notice: Subject to any disclaimer, the term of this patent is extended or adjusted under 35 U.S.C. 154(b) by 774 days.

(21) Appl. No.: 16/231,446

(22) Filed: Dec. 22, 2018

(65) Prior Publication Data

US 2020/0204431 A1 Jun. 25, 2020

(51) Int. Cl.
| | | |
|---|---|---|
| *G06F 3/048* | (2013.01) | |
| *H04L 41/069* | (2022.01) | |
| *G06N 20/20* | (2019.01) | |
| *G06F 16/35* | (2019.01) | |
| *G06K 9/62* | (2022.01) | |
| *G06F 3/0481* | (2022.01) | |

(52) U.S. Cl.
CPC ............ *H04L 41/069* (2013.01); *G06F 16/35* (2019.01); *G06K 9/6227* (2013.01); *G06N 20/20* (2019.01); *G06F 3/0481* (2013.01)

(58) Field of Classification Search
CPC .......... G06N 20/20; G06N 7/005; G06N 3/08; G06N 5/04; G06F 16/35; G06F 16/355; G06K 9/6227; G06K 9/6267; H04L 41/16; H04L 41/5074; G06T 2207/20081; G06T 2207/20084; G16H 30/40
See application file for complete search history.

(56) References Cited

U.S. PATENT DOCUMENTS

| | | | | |
|---|---|---|---|---|
| 8,473,432 B2* | 6/2013 | Anerousis | ............... | G06N 5/043 |
| | | | | 706/12 |
| 9,229,800 B2* | 1/2016 | Jain | ......................... | G06N 5/022 |
| 9,524,475 B1* | 12/2016 | Cmielowski | ........... | G06N 20/00 |

(Continued)

OTHER PUBLICATIONS

U.S. Appl. No. 15/908,596, filed Feb. 28, 2018.

(Continued)

*Primary Examiner* — Steven B Theriault
(74) *Attorney, Agent, or Firm* — Maschoff Brennan

(57) ABSTRACT

A method of automated ticket resolution comprises training and testing feature-specific classifier models using ticket database records. The feature-specific classifier models include machine-learning-based classification models related to features of a ticket system. The method includes training and testing feature-specific solution models using resolved ticket solution database records. The feature-specific classifier models include machine-learning-based solution models related to the features. The method includes receiving a ticket inquiry including a ticket indicative of an issue related to the features, generating a problem statement representative of the issue using the tested classifier models, and communicating the problem statement to the tested solution models. The method includes predicting a solution to the problem statement by using the tested solution models. The solution includes directions to resolve the ticket. The method includes implementing the solution in the system to resolve the issue based on certainty characteristics of the solution and recover a system if required.

20 Claims, 10 Drawing Sheets

(56) References Cited

U.S. PATENT DOCUMENTS

| | | | | |
|---|---|---|---|---|
| 9,710,525 | B2* | 7/2017 | Dhoopar | G06F 16/248 |
| 10,270,644 | B1* | 4/2019 | Valsecchi | H04L 41/0654 |
| 10,366,346 | B2* | 7/2019 | Achin | G06N 20/00 |
| 10,438,212 | B1* | 10/2019 | Jilani | G06Q 30/0281 |
| 11,138,168 | B2* | 10/2021 | Purushothaman | H04L 43/16 |
| 2007/0100782 | A1* | 5/2007 | Reed | H04M 3/247 |
| 2008/0155564 | A1* | 6/2008 | Shcherbina | G06Q 10/04 |
| | | | | 719/318 |
| 2008/0201131 | A1* | 8/2008 | Kar | G06F 16/35 |
| | | | | 704/9 |
| 2013/0198119 | A1* | 8/2013 | Eberhardt, III | G06N 20/00 |
| | | | | 706/12 |
| 2014/0129536 | A1* | 5/2014 | Anand | G06N 7/005 |
| | | | | 707/706 |
| 2014/0351176 | A1* | 11/2014 | Jan | G06N 7/005 |
| | | | | 706/12 |
| 2015/0019912 | A1* | 1/2015 | Darling | G06F 11/2257 |
| | | | | 714/26 |
| 2015/0067140 | A1* | 3/2015 | Branch | H04L 41/147 |
| | | | | 709/224 |
| 2016/0350671 | A1* | 12/2016 | Morris, II | G06N 20/00 |
| 2017/0011308 | A1* | 1/2017 | Sun | G06F 11/00 |
| 2017/0019487 | A1* | 1/2017 | Maheshwari | H04L 41/22 |
| 2017/0083386 | A1* | 3/2017 | Wing | G06Q 10/10 |
| 2017/0083572 | A1* | 3/2017 | Tankersley | G06F 3/04847 |
| 2017/0161335 | A1* | 6/2017 | Akula | G06F 16/9024 |
| 2017/0212756 | A1* | 7/2017 | Ryali | G06F 8/60 |
| 2017/0286502 | A1* | 10/2017 | Bar-Or | G06F 16/2423 |
| 2018/0211260 | A1* | 7/2018 | Zhang | G06Q 30/016 |
| 2018/0285772 | A1* | 10/2018 | Gopalan | G06N 7/005 |
| 2018/0314958 | A1* | 11/2018 | Sethi | G06Q 10/20 |
| 2018/0330281 | A1* | 11/2018 | Teller | G06N 20/00 |
| 2018/0335900 | A1* | 11/2018 | Ramalingam | G06F 9/453 |
| 2018/0373578 | A1* | 12/2018 | Bridges | G06F 11/004 |
| 2018/0374104 | A1* | 12/2018 | Meusel | G05B 23/024 |
| 2019/0108470 | A1* | 4/2019 | Jain | G06Q 10/20 |
| 2019/0132191 | A1* | 5/2019 | Mann | G06N 5/046 |
| 2019/0158366 | A1* | 5/2019 | Higgins | G06Q 10/06313 |
| 2019/0347148 | A1* | 11/2019 | Gomes Pereira | G06F 11/079 |
| 2020/0065712 | A1* | 2/2020 | Wang | G06N 20/00 |
| 2020/0089761 | A1* | 3/2020 | Guerra | G06N 20/10 |
| 2020/0110596 | A1* | 4/2020 | Niininen | G06F 8/70 |
| 2020/0159690 | A1* | 5/2020 | J | G06F 9/44505 |
| 2020/0184355 | A1* | 6/2020 | Mehta | H04L 41/16 |
| 2020/0192874 | A1* | 6/2020 | Mann | G06Q 10/0633 |
| 2020/0202302 | A1* | 6/2020 | Rathod | G06F 40/295 |
| 2020/0210322 | A1* | 7/2020 | Sen | G06Q 10/103 |
| 2020/0372372 | A1* | 11/2020 | Jasionowski | G06F 16/2465 |

OTHER PUBLICATIONS

"Accenture Ticket Triage", 2014; https://www.accenture.com/us-en/~/media/Accenture/Conversion-Assets/DotCom/Documents/Global/PDF/Operations_2/Accenture-Network-BPO-Ticket-Triage-Infographic.pdf.

Vin Sachidananda et al. "Towards Intelligent Voice Assistants for SPNs", Feb. 9, 2018; https://platformlab.stanford.edu/Presentations/2018/Vin%20Sachidananda.pdf.

* cited by examiner

| ID | Status | Summary 606 | Description 608 | Type | Name_Module | Priority |
|---|---|---|---|---|---|---|
| 0010 | Closed | Intra-department Discussion October 21, 2018 | Discussion with team, client, regarding first project | Service_Type | Internal Comm. Module | Medium |
| 0011 | Open | Creation of documents for project specification | Creation of documents for project specification | Service_Type | Operational Module | High |
| 0110 | Closed | Daily Update for October 22, 2018 | Daily Update for October 22, 2018 | Service_Type | Operational Module | Medium |
| 0250 | Open | Intra-department Discussion | Discussion between ATMM department and KIPP department | Service_Type | Internal Comm. Module | High |
| 0045 | Closed | Invoice issue Invoice 3332 | Can you provide information on Invoice 3332. Thanks First client | Finance_Type | Finance | Medium |
| 0022 | Closed | Query of Approval Groups | Hello Representative, Please Write a Query for Group Approval | Service_Type | Internal Comm. Module | Low |

FIG. 6

AUTOMATED MACHINE-LEARNING-BASED TICKET RESOLUTION FOR SYSTEM RECOVERY

FIELD

The embodiments discussed herein are related to automated machine-learning-based ticket resolution for system recovery.

BACKGROUND

A chat bot and/or a ticket submission system may be implemented to troubleshoot, create, update, and resolve issues in computing systems. In general, a user may manually submit a ticket to an issue tracking system. In conventional ticket submission systems, the tickets are submitted, then manually evaluated and resolved to recover a computing system. For instance, a technical representative may receive the ticket automatically or manually through chat, phone call, email, online submission system, determines an appropriate solution to the issue by ticket processor. The technical representative and/or ticket processor may then implement the solution or work with the user to implement the solution.

The subject matter claimed herein is not limited to embodiments that solve any disadvantages or that operate only in environments, such as those described. Rather, this background is only provided to illustrate one example technology area where some embodiments described herein may be practiced.

SUMMARY

According to an aspect of an embodiment, a method of automated ticket resolution may include training feature-specific classifier models using a first portion of ticket database records. The feature-specific classifier models may include two or more machine-learning based classification models that are each related to one or multiple features of a plurality of features of a system. The method may include testing the feature-specific classifier models using a second portion of the ticket database records. The method may include training feature-specific solution models using a first portion of resolved ticket solution database records. The feature-specific classifier models may include two or more machine-learning based solution models that are each related to one feature of the plurality of features of the system. The method may include testing the feature-specific solution models using a second portion of the resolved ticket solution database records. The method may include receiving a ticket inquiry. The ticket inquiry may include a ticket that is indicative of an issue in the system and that is related to one or more features of the plurality of features. The method may include generating a problem statement representative of the ticket inquiry using the tested feature-specific classifier model. The problem statement may be associated with the one or more features of the ticket inquiry. The method may include communicating the generated problem statement to the feature-specific solution models. The method may include predicting a solution to the generated problem statement using the feature-specific solution models. The predicted solution may include a set of directions to resolve the ticket and/or one or more certainty characteristics of the predicted solution. The method may include implementing the predicted solution in the system to resolve the issue in the system. The implementing the predicted solution may be based on the certainty characteristics.

The object and advantages of the embodiments will be realized and achieved at least by the elements, features, and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIG. 6 depicts example data that may be implemented in the operating environment of FIG. 1;

DESCRIPTION OF EMBODIMENTS

Figure 1:
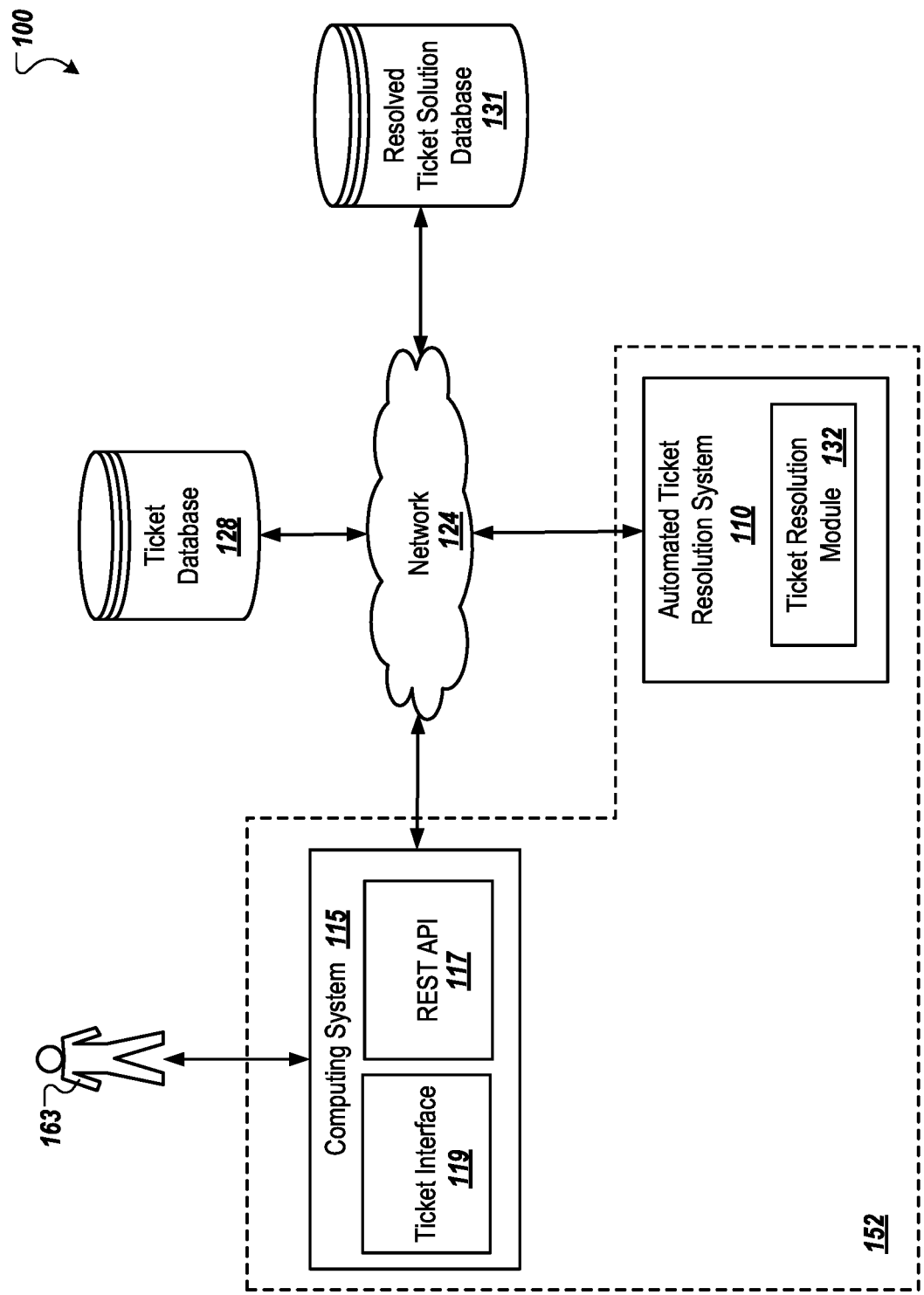
FIG. 1 illustrates a block diagram of an example operating environment.

Ticket submission systems may be implemented to troubleshoot and resolve issues in computing systems. In conventional ticket submission systems, a user may submit a ticket, which is then manually evaluated and resolved. For instance, a technical representative may receive the ticket, manually determine a problem statement, and manually determine an appropriate solution to the issue. The technical representative may then implement the solution or work with the user to implement the solution. Currently, these systems expend significant resources such as human-based manual issue identification and time to resolve tickets.

Accordingly, embodiments described in the present disclosure relate to an automated ticket resolution system. The automated ticket resolution system performs one or more of the task that were previously performed by the technical representative and to which traditional computing systems were not able to perform. The resolution system may be configured to build and develop machine-learning-based models that are used to automatically or at least partially automatically resolve issues in computing systems. The resolution system may develop sets of models based on data from a ticket database and/or a resolved ticket solution database. The resolution system may train the models based on a portion of the data and then test the models based on another portion of the data. After the models are trained and tested, the resolution system may then address new ticket inquiries that are submitted from the computing system. For example, the resolution system may receive the ticket inquiry from the computing system and use the models to determine a problem statement representative of an issue of the ticket inquiry. The resolution system may then predict a solution to the issue.

The resolution system may then implement the solution. The solution may be implemented based at least partially on one or more certainty characteristics of the solution. For instance, responsive to the certainty characteristics of the solution being below a threshold value, the implementation of the solution may be performed at least partially by a human or under supervision of a human. Responsive to the characteristics of the solution being above the threshold value, the solution may be automatically implemented by the resolution system. Automatic implementation of the solution may be with no or with minimal action by a human.

For example, automatic implementation by the resolution system may include communication of one or more electronic commands to the computing system that are configured to control operation of one or more functions of the computing system. The electronic commands communicated to the computing system may change an operational state of the computing system. Examples of the change in the operational state that results from the electronic commands may include a system recovery, a domain-specific system recovery, a domain-specific reset, a system reset, pushing and/or installation of software or a software update, implementing a particular sequence of inputs to the computing system, and the like.

Accordingly, the resolution system may provide a technical solution to issues that occur at the computing system. The technical solution may include automatically or at least partially automatically determining a problem statement using machine-learning-based models, predicting a solution to the problem statement using machine-learning-based modules, and implementing the solution. The embodiments described in the present disclosure reduce expenditure of resources related to problem statement determination and solution prediction. Moreover, the embodiments of the present disclosure reduce downtime associated because of technical issues and improve the technical functionality of the computing system.

These and other embodiments are described with reference to the appended Figures in which like item number indicates like function and structure unless described otherwise.

FIG. 1 illustrates a block diagram of an example operating environment 100 arranged in accordance with at least one embodiment described herein. The operating environment 100 may include an automated ticket resolution system (resolution system) 110 that is configured to build and develop machine-learning-based models that are used to automatically or at least partially automatically resolve issues in computing systems such as a networking issue in computing system 115. The resolution system 110 may include a ticket resolution module 132 that develops sets of models based on data from a ticket database (ticket DB) 128 and a resolved ticket solution database (RTS-DB) 131. The resolution system 110 may train the models based on a portion of the data from the ticket DB 128 and the RTS-DB 131. The resolution system 110 may then test the models based on another portion of the data from the ticket DB 128 and the RTS-DB 131.

After the models are trained and tested, the resolution system 110 may then address new ticket inquiries that are submitted from a computing system 115. For example, the resolution system 110 may receive the ticket inquiry from the computing system 115. The resolution system 110 may then use the models to determine a problem statement representative of an issue of the ticket inquiry and to predict a solution to the issue.

In some embodiments, the resolution system 110 may build and develop two sets of models. A first set of models may include classifier models and a second set of models may include solutions models. The classifier models may be configured to determine the problem statement. The solution models may be configured to predict the solution.

The resolution system 110 may then implement the solution. The implementation of the solution may be based on one or more certainty characteristics such as risk and confidence. The resolution system 110 may calculate the certainty characteristics and compare the certainty characteristics to threshold values. Responsive to the certainty characteristics of the solution being below the threshold value, the implementation of the solution may be performed at least partially by a human or under supervision of a human. Responsive to the characteristics of the solution being above the threshold value, the solution may be automatically implemented by the resolution system 110. Automatic implementation of the solution may be with no or with minimal action by a human.

For example, automatic implementation by the resolution system 110 may include communication of one or more electronic commands to the computing system 115. The electronic commands may be configured to control operation of one or more functions of the computing system 115. In particular, the electronic commands communicated to the computing system 115 may change an operational state of the computing system. Examples of the change in the operational state that results from the electronic commands may include a system recovery, a domain-specific system recovery, a domain-specific reset, a system reset, pushing and/or installation of software or a software update, implementing a particular sequence of inputs to the computing system 115, and the like.

Accordingly, in some embodiments, the resolution system 110 may provide a technical solution to issues that occur at the computing system 115. The technical solution may include automatically or at least partially automatically determining a problem statement using machine-learning-based models, predicting a solution to the problem statement using machine-learning-based modules, and implementing the solution. In some conventional systems, the problem statements and the solutions were manually determined using human representatives. Thus, embodiments described in the present disclosure provide an improvement to computer technology over such conventional systems. The embodiments described in the present disclosure reduce expenditure of resources related to problem statement determination and solution prediction. Moreover, the embodiments of the present disclosure reduce downtime associated because of technical issues and improve the technical functionality of the computing system 115.

The operating environment 100 of FIG. 1 may include the resolution system 110, the ticket DB 128, the RTS-DB 131, and the computing system 115. The resolution system 110, the ticket DB 128, the RTS-DB 131, and the computing system 115 or some combination thereof may communicate information and data via a network 124. Each of the network 124, the ticket DB 128, the RTS-DB 131, and the computing system 115 are briefly described below.

The network 124 may include any communication network configured for communication of signals between any of the components (e.g., 110, 115, 128, and 131) of the operating environment 100. The network 124 may be wired or wireless. The network 124 may have numerous configurations including a star configuration, a token ring configuration, or another suitable configuration. Furthermore, the network 124 may include a local area network (LAN), a wide area network (WAN) (e.g., the Internet), and/or other interconnected data paths across which multiple devices may communicate. In some embodiments, the network 124 may include a peer-to-peer network. The network 124 may also be coupled to or include portions of a telecommunications network that may enable communication of data in a variety of different communication protocols.

In some embodiments, the network 124 includes or is configured to include a BLUETOOTH® communication network, a Z-Wave® communication network, an Insteon® communication network, an EnOcean® communication network, a Wi-Fi communication network, a ZigBee communication network, a HomePlug communication network, a Power-line Communication (PLC) communication network, a message queue telemetry transport (MQTT) communication network, a MQTT-sensor (MQTT-S) communication network, a constrained application protocol (CoAP) communication network, a representative state transfer application protocol interface (REST API) communication network, an extensible messaging and presence protocol (XMPP) communication network, a cellular communication network, any similar communication networks, or any combination thereof for sending and receiving data. The data communicated in the network 124 may include data communicated via short messaging service (SMS), multimedia messaging service (MMS), hypertext transfer protocol (HTTP), direct data connection, wireless application protocol (WAP), e-mail, smart energy profile (SEP), ECHONET Lite, OpenADR, or any other protocol that may be implemented with the network 124, the ticket DB 128, the RTS-DB 131, and the computing system 115.

The ticket DB 128 and the RTS-DB 131 may include any memory or data storage, which may be similar to memory 712 elsewhere in the present disclosure. The ticket DB 128 and the RTS-DB 131 may include network communication capabilities such that other components in the operating environment 100 may communicate with the ticket DB 128 and the RTS-DB 131. For example, the ticket DB 128 and the RTS-DB 131 may enable or allow the resolution system 110 to access ticket DB data and/or RTS-DB data. For example, the resolution system 110 may access ticket DB data and/or RTS-DB data via the network 124 and may use the ticket DB data and/or RTS-DB data to train and to test models.

In some embodiments, the ticket DB data may include classification information, which may originate from a managed customer service department. For example, the ticket DB data may include classification information related to or originating at the computing system 115. In particular, the ticket DB data may be collected by one or more customer service agents or manual ticket systems in response to manually entered tickets. For instance, the computing system 115 may be configured to manually interface with a user 163. Prior to installation of the resolution system 110, the ticket DB data may be generated as the user 163 submits ticket inquiries and receives solutions to the submitted ticket inquiries. The ticket DB data may include the classification information, which may further include customer information, billing information, problem information issued as a ticket, affected area information, issue type, reporter person information, ticket log information, timestamp information, other detail information related to the problem information, attachments related to tickets, or combinations thereof.

The RTS-DB data may include solution information. Like the ticket DB data, the RTS-DB data may include solution information from the managed customer service department. The RTS-DB data may include solution information that includes solutions to records in the ticket DB 128. Some additional details of the ticket DB data and the RTS-DB data are provided with reference to FIG. 6.

In the depicted embodiment, the ticket DB 128 and the RTS-DB 131 are depicted as separate from the resolution system 110. In some embodiments, the resolution system 110 may include the ticket DB 128 and/or the RTS-DB 131. In these and other embodiments, the resolution system 110 may communicate with the ticket DB 128 and the RTS-DB 131 via an electrical bus or another direct electrical connection.

The computing system 115 may include a hardware-based computing device that is configured to communicate data and information with one or more of the components of the operating environment 100. The computing system 115 may include a ticket interface 119 and/or an application programming interface (API) such as REST API 117.

The ticket interface 119 may include a graphical user interface (GUI) or another suitable interface that is configured to receive input from the user 163. For example, the ticket interface 119 may include graphical information that may be selected by the user 163 or may be configured to receive information provided by the user 163. The ticket interface 119 may be configured to receive information from the user 163 and generate a ticket inquiry based thereon. The ticket inquiry may include data and information related to an issue of the computing system 115 or another system. In some embodiments, the ticket inquiry may include text such as "Help Resetting My Password" or "Non-Responsive Application." In other embodiments, the ticket inquiry may include some additional information, which may be related to a particular service request.

In some embodiments, the ticket interface 119 may communicate ticket inquiry to the resolution system 110. For example, the ticket interface 119 may communicate the ticket inquiry to the resolution system 110 via the network 124.

The REST API 117 may be implemented at the computing system 115. The REST API 117 may enable the ticket interface 119 to communicate with the resolution system 110. For example, the REST API 117 may reformat the information provided by the user 163 in a particular format that is acceptable by the resolution system 110.

Implementation of the REST API 117 may be in the computing systems 115 in which the resolution system 110 is remotely implemented with the computing system 115. For example, the computing system 115 may owned or otherwise associated with a first entity. The resolution system 110 may be owned or otherwise associated with a second entity. The first entity may contract with the second entity to provide ticket resolution services. To provide the ticket resolution services, the second entity may install the REST API 117 at the computing system 115.

In the embodiment of FIG. 1, the computing system 115 is depicted separately from the resolution system 110. In some embodiments, the computing system 115 may be included with the resolution system 110. For instance, the computing system 115 and the resolution system 110 may be included in a single system 152. In these and other embodiments, the resolution system 110 may communicated directly with the computing system 115 at least partially via an electronic bus rather than via the network 124.

The resolution system 110 may include a hardware-based computing system. The resolution system 110 may be configured to communicate with other components of the operating environment 100 via the network 124. The resolution system 110 may include the ticket resolution module 132 (hereinafter, "resolution module 132"). The resolution module 132 may be configured to implement or control the implementation of one or more processes to automatic ticket resolution.

In general, the resolution module 132 may be configured to implement one or more automated ticket resolution processes. In general, the resolution module 132 may be configured to build and develop models. For instance, the resolution module 132 may be configured to train models. In some embodiments, the models may include feature-specific classifier models and feature-specific solution models. In these and other embodiments, the resolution module 132 may be configured to train feature-specific classifier models using a first portion of ticket DB data from the ticket DB 128. The feature-specific classifier models may include two or more machine-learning-based classification models that are each related to one or more features of the computing system 115. The features of the computing system 115 may include a category, a class, a characteristic, a component, or an organizational sub-component of the computing system 115. For example, the features may include a priority of an issue represented in the ticket inquiry, a module of the computing system 115, an assignment (e.g., an individual) to which the issue is routed for resolution, an assigned group to which the issue is routed for resolution, an affected area of the computing system 115 that is effected by the issue, or some combination thereof. Accordingly, the feature-specific classifier models of the computing system 115 may include a module-specific classifier model, a priority-specific classifier model, and an assignment-specific classifier model. The module-specific classifier model may be configured to receive ticket inquiries. The module-specific classifier model may generate a problem statement that includes a module of the computing system 115 that resolves the issue of the ticket inquiry. The other models may operate similarly.

The resolution module 132 may then test the feature-specific classifier models. The resolution module 132 may test the feature-specific classifier models using a second portion of the ticket DB data. The testing of the feature-specific classifier models may ensure that the problem statements generated by the trained models are consistent with problem statements of the ticket DB data. In some embodiments, the first portion of the ticket DB data may be about 70%, about 75%, about 80%, about 85% or another suitable percentage of a total amount of the ticket DB data. Correspondingly, the second portion of the ticket DB data may be about 30%, about 25%, about 20%, about 15% or another suitable percentage of the total amount of the ticket DB data.

The resolution module 132 may train the feature-specific solution models. As described above, a first portion of resolved ticket solution database data or records of the RTS-DB 131 may be used to train the feature-specific solution models. The feature-specific classifier models may include two or more machine-learning-based solution models related to one or more of the features of the computing system 115. The resolution module 132 may then test the feature-specific solution model using a second portion of the resolved ticket solution database data. As with the feature-specific classification models, the first portion of the RTS-DB data may be about 70%, about 75%, about 80%, about 85% or another suitable percentage of a total amount of the RTS-DB data or records. Correspondently, the second portion of the RTS-DB data may be about 30%, about 25%, about 20%, about 15% or another suitable percentage of the total amount of the RTS-DB data.

The resolution module 132 may receive a ticket inquiry. As introduced above, the ticket inquiry may include a ticket that is indicative of an issue in the computing system 115. The issue of the ticket inquiry may be related to one or more of the features of the computing system 115. For instance, the issue may be related to a particular feature (e.g., related to a particular module of the computing system 115 or to a particular affected area of the computing system 115).

The resolution module 132 may generate a problem statement. For instance, the problem statement may be generated by the tested feature-specific classifier models. The problem statement may be representative of the issue of the ticket inquiry. The problem statement may be associated with one or more features of the computing system 115 implicated by or included in the ticket inquiry. The generated problem statement may be communicated from the feature-specific classifier models to the feature-specific solution models.

The resolution module 132 may predict a solution to the generated problem statement. For instance, the feature-specific solution models may predict the solution based on the generated problem statement. The predicted solution may include a set of directions to resolve the ticket. Additionally, the predicted solution may include one or more certainty characteristics of the predicted solution.

The resolution module 132 may implement the predicted solution in the computing system 115. The predicted solution may be implemented to resolve the issue. The implementation may be based on the certainty characteristics. For instance, the certainty characteristics may include risk and confidence, which may be predicted by the resolution module 132 based on the ticket DB data and the RTS-DB data. The resolution module 132 may compare the risk and confidence to a risk threshold and a confidence threshold, respectively. Responsive to the calculated risk being above the risk threshold and the calculated confidence being above a confidence threshold, the predicted solution may be implemented automatically without action by a human representative. Responsive to the calculated risk being below the risk threshold and/or the calculated confidence being below the confidence threshold, the predicted solution may be implemented at least partially through an action of a human or under a direction of the human. The resolution module 132 may retrain the feature-specific classifier models and/or the feature-specific solution models using the predicted solution and the generated problem statement.

The resolution module 132, the ticket interface 119, the REST API 117, and one or more components or modules thereof described throughout the present disclosure may be implemented using hardware including a processor, a microprocessor (e.g., to perform or control performance of one or more operations), a field-programmable gate array (FPGA), or an application-specific integrated circuit (ASIC). In some other instances, the resolution module 132, the ticket interface 119, the REST API 117, and one or more components or modules may be implemented using a combination of hardware and software. Implementation in software may include rapid activation and deactivation of one or more transistors or transistor elements such as may be included in hardware of a computing system (e.g., the resolution system 110). Additionally, software defined instructions may operate on information within transistor elements. Implementation of software instructions may at least temporarily reconfigure electronic pathways and transform computing hardware.

Modifications, additions, or omissions may be made to the operating environment 100 without departing from the scope of the present disclosure. For example, the operating environment 100 may include one or more ticket DBs 128, one or more RTS-DBs 131, one or more computing systems 115, one or more resolution systems 110, or any combination thereof. Moreover, the separation of various components and servers in the embodiments described herein is not meant to indicate that the separation occurs in all embodiments. For example, the ticket DB 128, the RTS-DB 131, and the computing system 115 may be integrated with the resolution system 110. Moreover, it may be understood with the benefit of this disclosure that the described components and servers may generally be integrated together in a single component or server or separated into multiple components or servers.

Figure 2:
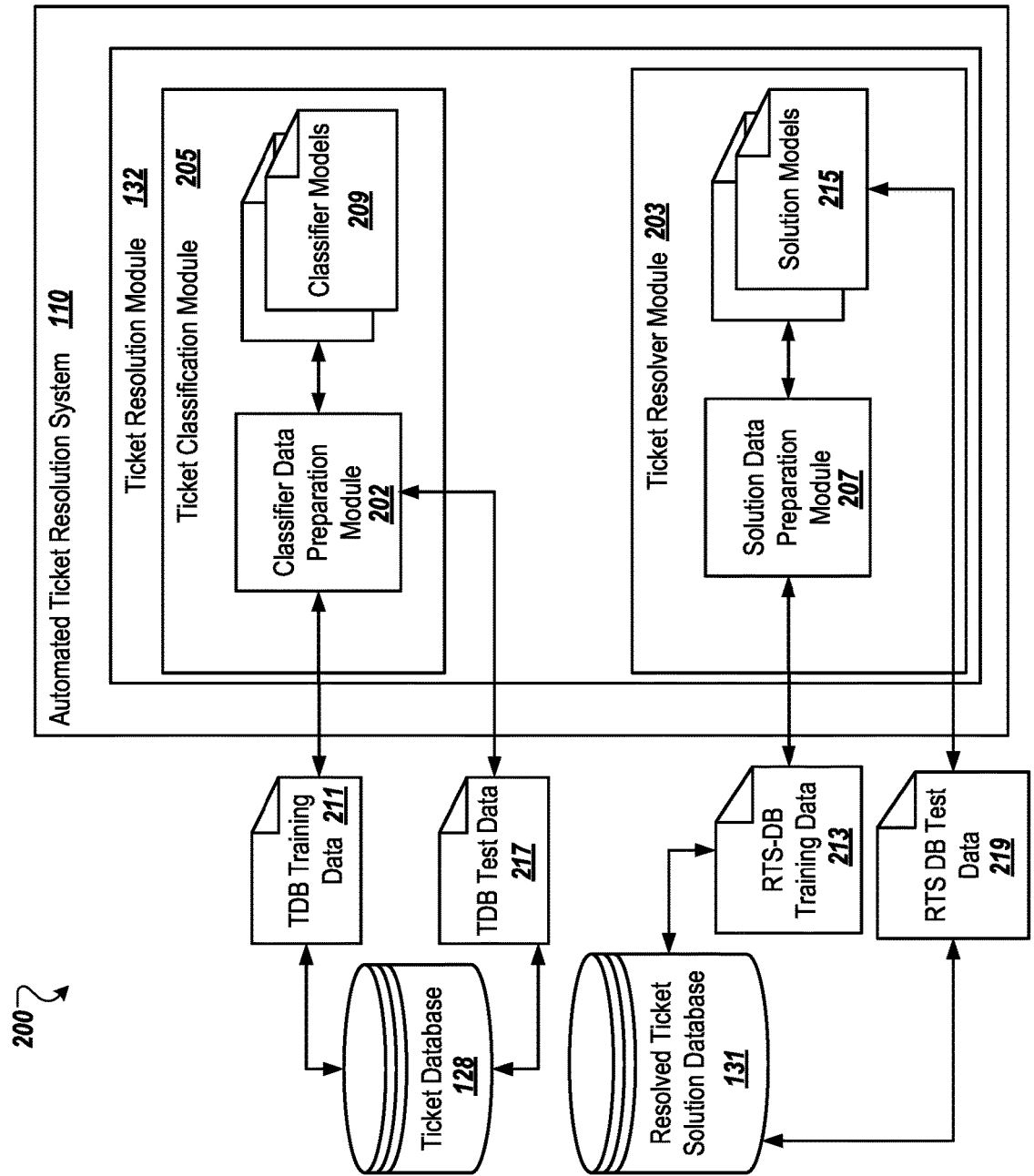
FIG. 2 depicts an example model development process that may implement in the operating environment of FIG. 1.

FIG. 2 depicts an example model development process 200 that may implement in the operating environment 100 of FIG. 1. The model development process 200 of FIG. 2 may involve the resolution system 110, the ticket DB 128, and the RTS-DB 131 of FIG. 1. In the model development process 200, the ticket DB 128 and the RTS-DB 131 are shown in direct communication with the resolution system 110. In some embodiments, the ticket DB 128 and/or the RTS-DB 131 may be configured to communicate with the resolution system 110 via a communication network such as the network 124 of FIG. 1.

The resolution model 132 may include a ticket classification module 205 and a ticket resolver module 203. The ticket classification module 205 may be configured to receive the TDB data 211 and 217 and build classifier models 209. The classifier models 209 are configured to receive a ticket inquiry and generate a problem statement based thereon. The ticket resolver module 203 may be configured to receive RTS-DB data 213 and 219. Solution models 215 may be built based on the RTS-DB data 213 and 219. The solution models 215 may be configured to receive the problem statement, generate a solution to the problem statement, and to implement the solution in a computing system (e.g., 115 of FIG. 1).

In the model development process 200, ticket database training data (TDB training data) 211 may be received by or accessed by the resolution system 110. For instance, the resolution system 110 may access the TDB training data 211 from the ticket DB 128. The TDB training data 211 include a first portion of ticket DB data stored on the ticket DB 128. The TDB training data 211 may be received by a classifier data preparation module (classifier-prep module) 202. The classifier-prep module 202 may be configured to prepare the TDB training data 211 prior to training the classifier models 209.

The classifier-prep module 202 may modify or alter the TDB training data 211 such that the TDB training data 211 may be used to train classifier models 209. For instance, the classifier-prep module 202 may be configured to extract text from the TDB training data 211, and then clean the TDB training data 211. A numerical statistic such as term frequency-inverse document frequency (TFIDF) may be implemented by the classifier-prep module 202. Additionally or alternatively, the classifier-prep module 202 may group portions of the TDB training data 211. The classifier-prep module 202 may then vectorize the portion of the TDB training data 211. The vectorized TDB training data 211 may then be communicated to the classifier models 209.

The ticket classification module 205 may train feature-specific classifier models (classifier models) 209 using the prepared data. The classifier models 209 may include two or more machine-learning-based classification models that are each related to one or more features of a system such as the computing system 115 of FIG. 1. For instance, the features of the computing system 115 may include a priority, a module, an assignment, a type, an assigned group, and an affected area in some embodiments. The classifier models 209 may accordingly include a priority-specific classifier model, a module-specific classifier model, an assignment-specific classifier model, an assigned group-specific classifier model, and an affected area-specific classifier model.

In some embodiments, the classifier models 209 may be trained using one or more machine-learning algorithms. Some examples of the machine-learning algorithms may include support vector machine (SVM) training algorithms, which may include linear SVM algorithms, nonlinear SVM algorithms, support vector clustering (SVC) algorithms, and the like. Additionally or alternatively, the machine-learning algorithms may include naive Bayes classifiers or another suitable conditional probability model. Some additional details of some algorithms that may be suitable for use by the classifier models 209 is provided at Pedregosa, Fabian, et al. "Scikit-learn: Machine learning in Python:" *Journal of Machine Learning Research* 12 October (2011): 2825-2830, which is incorporated herein by reference in its entirety.

After the classifier models 209 are trained, the TDB test data 217 may be accessed or received from the ticket DB 128. In some embodiments, the TDB test data 217 may be received by the classifier-prep module 202. In other embodiments, the TDB test data 217 may be communicated direction to the classifier models 209. The classifier-prep module 202 may prepare the TDB test data 217 such that the TDB test data 217 may be used to test the classifier models 209. The ticket classification module 205 may use the prepared TDB test data to test the classifier models 209.

The TDB training data 211 may include a first portion of the ticket DB data and the TDB test data 217 may include a second portion of the ticket DB data. In some embodiments, the first portion is about 70% of a total amount of the ticket DB data and the second portion of the ticket DB data is about 30% of a total amount of the ticket DB data. In other embodiments, the first portion and the second portion may include another suitable split.

In the model development process 200, RTS-DB training data 213 may be received by or accessed by the resolution system 110. For instance, the resolution system 110 may access the RTS-DB training data 213 from the RTS-DB 131. The RTS-DB training data 213 may include a first portion of RTS-DB data stored on the RTS-DB 131. The RTS-DB training data 213 may be received by a solution data preparation module (solution-prep module) 207. The solution-prep module 207 may be configured to prepare the RTS-DB training data 213 prior to training the solution models 215.

The solution-prep module 207 may be similar to the classifier-prep module 202. For example, the solution-prep module 207 may modify or alter the RTS-DB training data 213 such that the RTS-DB training data 213 may be used to train solution models 215. For instance, the solution-prep module 207 may be configured to extract text, clean text, apply a numerical statistic, etc. to the RTS-DB training data 213. Additionally or alternatively, the solution-prep module 207 may group portions of the RTS-DB training data 213.

The classifier-prep module 202 may then vectorize the portion of the RTS-DB training data 213. The vectorized RTS-DB training data 213 may then be communicated to the solution models 215.

The ticket resolver module 203 may train feature-specific solution models (solution models) 215 using the prepared data. The solution models 215 may include two or more machine-learning-based solution models that are each related to one or more features of a system such as the computing system 115 of FIG. 1. Similar to the classifier models 209, a computing system (e.g., 115) may have features that include a priority, a module, an assignment, an assigned group, and an affected area in some embodiments. The solution models 215 may accordingly include a priority-specific solution model, a module-specific solution model, an assignment-specific solution model, an assigned group-specific solution model, and an affected area-specific solution model.

In some embodiments, the solution models 215 may be trained using one or more machine-learning algorithms. Some examples of the machine-learning algorithms are provided above.

After the solution models 215 are trained, the RTS-DB test data 219 may be accessed or received from the RTS-DB 131. In some embodiments, the RTS-DB test data 219 may be received by the solution-prep module 207. In other embodiments, the RTS-DB test data 219 may be communicated direction to the solution models 215. The solution-prep module 207 may prepare the RTS-DB test data 219 such that the RTS-DB test data 219 may be used to test the solution models 215. The ticket resolver module 203 may use the prepared RTS-DB test data to test the solution models 215.

The RTS-DB training data 213 may include a first portion of the RTS-DB data and the RTS-DB test data 219 may include a second portion of the RTS-DB data. In some embodiments, the first portion is about 70% of a total amount of the RTS-DB data and the second portion of the ticket DB data is about 30% of a total amount of the RTS-DB data. In other embodiments, the first portion and the second portion may include another suitable split.

Figure 3:
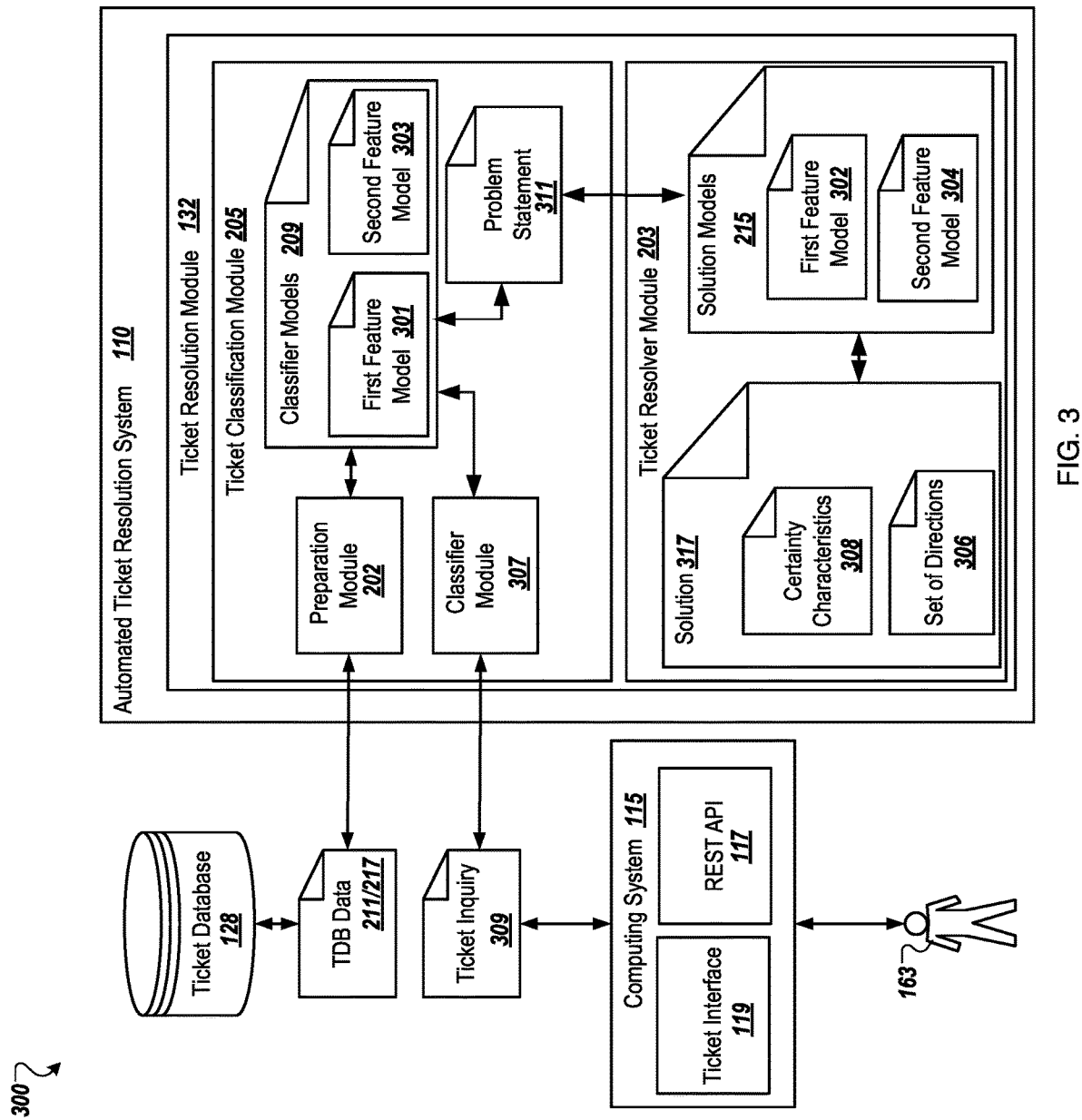
FIG. 3 depicts an example solution prediction process that may implement in the operating environment of FIG. 1.

FIG. 3 depicts an example solution prediction process 300 that may implement in the operating environment 100 of FIG. 1. The solution prediction process 300 of FIG. 3 may involve the resolution system 110, the ticket DB 128, and the computing system 115 of FIG. 1. In the solution prediction process 300, the ticket DB 128 and the computing system 115 are shown in direct communication with the resolution system 110. In some embodiments, the ticket DB 128 and/or the computing system 115 may be configured to communicate with the resolution system 110 via a communication network such as the network 124 of FIG. 1.

In the solution prediction process 300, the resolution system 110 may receive a ticket inquiry 309 from the computing system 115. The ticket inquiry 309 may include a ticket that is indicative of an issue in the computing system 115. The issue may be related to one or more of the features of the computing system 115. The ticket inquiry 309 may be received directly from the ticket interface 119, which may include a live user ticket interface or GUI. Additionally or alternatively, the ticket inquiry 309 may be received from the ticket interface 119 via the REST API 117. For example, the user 163 may input information into the computing system 115 via the ticket interface 119. The information input to the ticket interface 119 may be used to generate the ticket inquiry 309. The ticket inquiry 309 may then be communicated from the computing system 115 to the resolution system 110. The ticket inquiry 309 may be communicated directly or via the REST API 117. Additionally or alternatively, the information input to the ticket interface 119 may be communicated to the resolution system 110 via the REST API 117. The ticket inquiry 309 may be generated at the resolution system 110.

The ticket inquiry 309 may be received by a classifier module 307. The classifier module 307 may be configured to detect the features of the computing system 115 in the ticket of the ticket inquiry 309. Detection of the features may be based on an analysis of text of the ticket inquiry 309 and/or summary information of the ticket inquiry 309. The classifier module 307 may be configured to communicate the ticket or information derived therefrom to one of the feature-specific classifier models 209. In particular, the classifier module 307 may be communicate the ticket to the feature-specific classifier models 209 that correspond to the detected features of the ticket. For instance, the classifier module 307 may detect that a priority feature and a module feature may be implicated or included in the ticket. The classifier module 307 may accordingly communicate the ticket to the priority-specific classifier model, which may be a first feature model 201 and to the module-specific classifier models, which may be a second feature model 303.

One or more of the ticket classifier models 205 that received the ticket may be configured to generate a problem statement 311 representative of the issue of the ticket. For example, the problem statement 311 may generated by the first feature model 301 and/or the second feature model 303. The problem statement 311 may be associated with or specific to the features of the ticket inquiry. For instance, referring to the example above, the problem statement 311 may be associated with or related to the priority feature and the module feature of the computing systems 115.

The ticket classification module 205 may communicate the problem statement 311 to the feature-specific solution models ("solution models" in FIG. 3) 215. The solution models 215 may be configured to predict a solution 317 to the problem statement 311. The solution 317 may be related to or associated with one or more of the features of the computing system 115. For instance, the solution models 215 may include multiple feature-specific models such as a first feature model 302 and a second feature model 304. As discussed above, the problem statement 311 may be associated with or related to one or more of the features of the computing system 115. The particular model of the solution models 215 used to generate the solution 317 may be the feature-specific models (e.g., 302 and 304) that are built for corresponding features. For example, the problem statement 311 may be related to or implicate the priority feature and the module feature. Accordingly, the priority-specific solution model of the solution models 215 and the module-specific solution model may predict the solution 317.

The solution 317 may include a set of directions 306 to resolve the ticket or issue therein and/or one or more certainty characteristics 308. The set of directions 306 may include specific portions of code, instructions, subroutines, human-readable instructions, and the like. The certainty characteristics 308 may reflect the confidence that the resolution system 110 has in the effectiveness of the set of directions 306 to solve the issue of the ticket. In some embodiments, the certainty characteristics 308 may be based on the TDB data 211/217 (or the RTS-DB data described above). For instance, if the TDB data 211/217 includes the exact set of directions 306 that were previously implemented for an issue that is similar or the same as an issue in the TDB data 211/217, then the certainty characteristics 308 may reflect a high level of certainty that the set of directions 306 will resolve the issue. However, if the TDB data 211/217 does not include anything similar to the set of directions 306 and/or the issue in the ticket is not found in the TDB data 211/217, then the certainty characteristics 308 may reflect a low level of certainty that the set of directions 306 will resolve the issue.

Figure 4A:
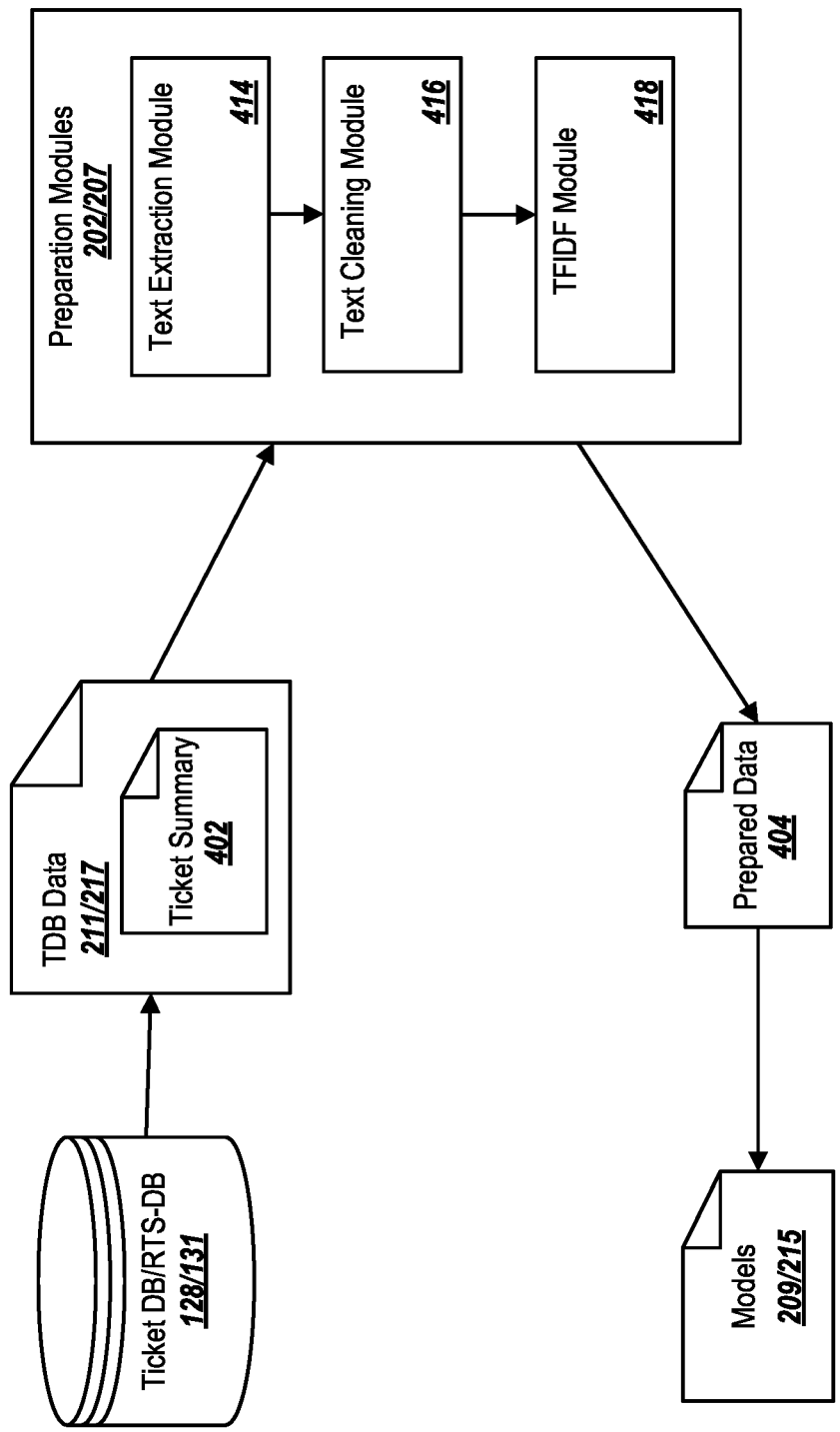
FIG. 4A illustrates example preparation modules that may be implemented in the operating environment of FIG. 1.
Figure 4B:
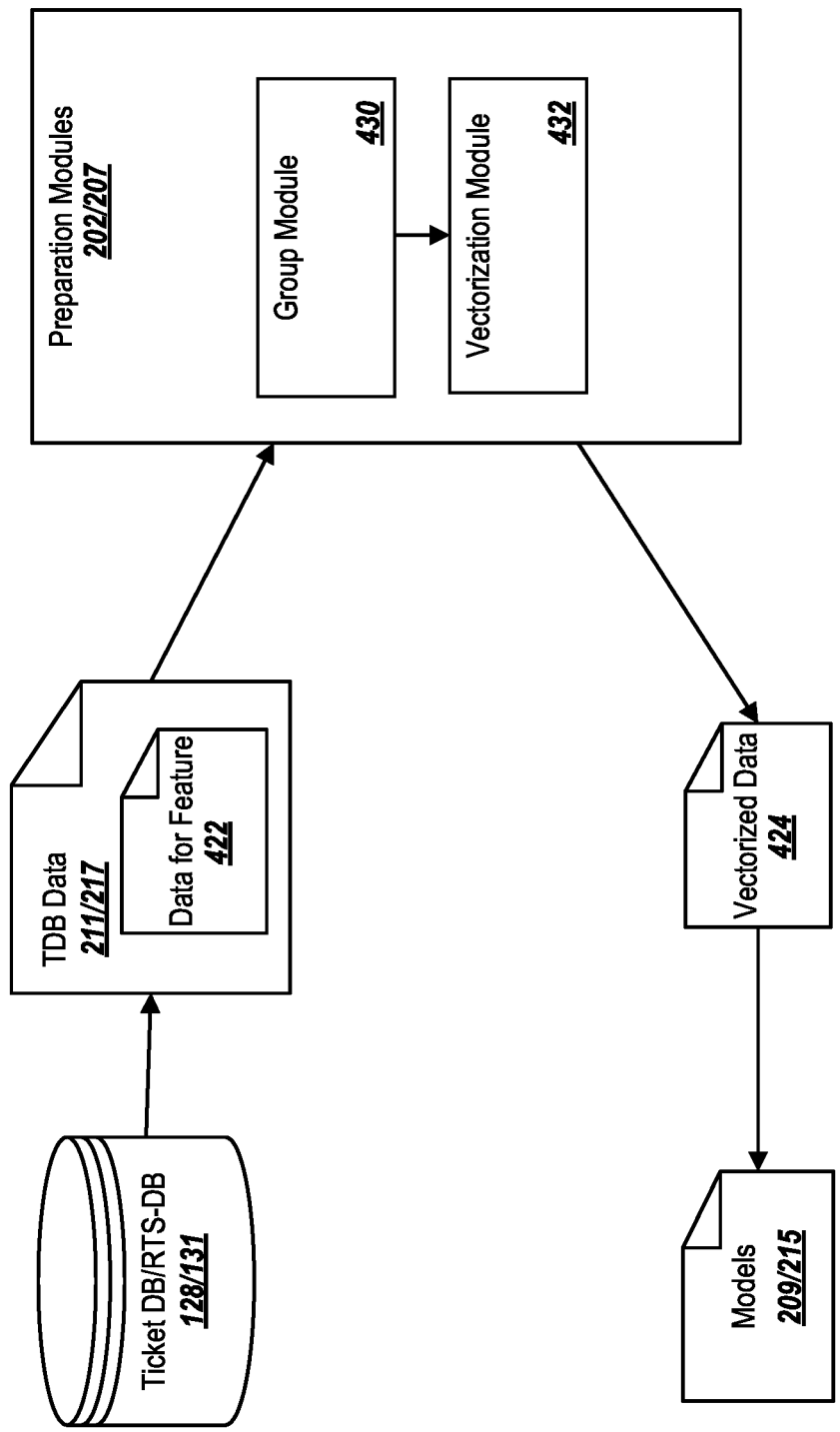
FIG. 4B illustrates additional example preparation modules that may be implemented in the operating environment of FIG. 1.

FIGS. 4A and 4B illustrates example preparation modules 202/207 that may be implemented in the operating environment 100 of FIG. 1. The preparation modules 202/207 are depicted with the ticket dB and the RTS-DB 128/131. The preparation modules 202/207 may include the classifier-prep module 202 and solution-prep module 207.

In the FIG. 4A, the preparation modules 202/207 may receive as input the TDB data 211/217 (or RTS-DB data) and output prepared data 404. The prepared data 404 may be extracted, cleaned, and one or more numerical statistic may be applied to the TDB data 211/217. Accordingly, the preparation modules 202/207 of FIG. 4A may include a text extraction module 414, a text cleaning module 416, and a TFIDF module 418. The text extraction module 414 may be configured to extract text from the TDB data 211/217. For instance, the TDB data 211/217 may include a ticket summary 402. The text extraction module 414 may parse the ticket summary 402 and extract text therefrom. The text cleaning module 416 may then clean the extracted text. For instance, the text cleaning module 416 may remove stop words and change characters to a tense, etc. The TFIDF module 418 may then apply a TFIDF to generate a set of words that are important in the portion of the TDB data 211/217. Accordingly, the prepared data 404 may include the set of words output by the TFIDF module 418. The prepared data 404 may be communicated to the models 209/215 where it may be used to train and/or test the models 209/215 as described above.

In the FIG. 4B, the preparation modules 202/207 may receive as input the TDB data 211/217 (or RTS-DB data) and output vectorized data 424. The vectorized data 424 may include a vector that is representative of a portion of the TDB data 211/217. In the embodiment of FIG. 4B, the preparation modules 202/207 may include a group module 430 and a vectorization module 432. The group module 430 may be configured to group features of the TDB data 211/217. The group module 430 may be based at least partially on data for features 422, which may be included in the TDB data 211/217. For instance, the group module 430 may group a portion of the TDB data 211/217 by a particular feature. The vectorization module 432 may apply a vectorization algorithm to a description of the group. The vectorized data 424 may accordingly include a numerical (or vector) representation of the description for the group. The vectorized data 424 may be communicated to the models 209/215 where it may be used to train and/or test the models 209/215 as described above.

Figure 5:
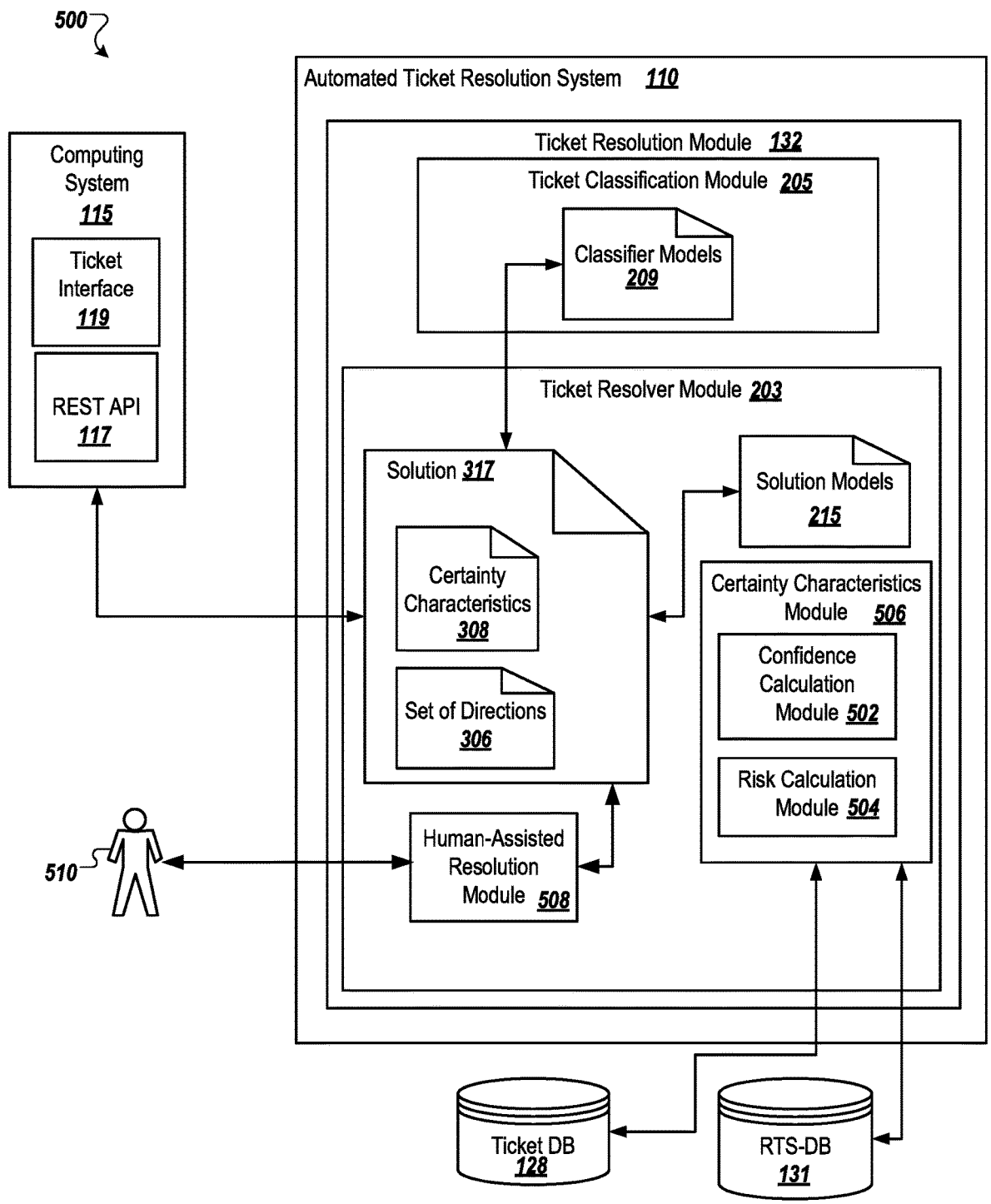
FIG. 5 depicts an example implementation process that may be implemented in the operating environment of FIG. 1.

FIG. 5 depicts an example implementation process 500 that may be implemented in the operating environment 100 of FIG. 1. FIG. 5 depicts the ticket resolution system 110 interfaced with the computing system 115, the ticket DB 128, and the RTS-DB 131. In FIG. 5, a detailed view of the ticket resolver module 203 of the ticket resolution module 132 is depicted. For example, the ticket resolver module 203 includes a certainty characteristics module 506.

The certainty characteristics module 506 may be configure to calculate one or more certainty characteristics. In some embodiments, the certainty characteristics module 506 may calculate the certainty characteristics based on data in the ticket DB 128 and the RTS-DB 131.

For example, the solution 317 may include the set of directions 306. Correspondence between the solution 317 and previous solutions in the data of the ticket DB 128 and the RTS-DB 131 may dictate the certainty characteristics.

In the embodiment of FIG. 5, the certainty characteristics may include risk and confidence. Accordingly, the certainty characteristics module 506 may include a confidence calculation module 502 and a risk calculation module 504. In other embodiments, one or more certainty characteristics may be included in the certainty characteristics.

The confidence calculation module 502 may be configured to calculate confidence of the solution 317. The confidence may be calculated at least partially using data from the ticket DB 128 and the RTS-DB 131. For example, the confidence may be calculated according to a confidence expression:

$$\text{Confidence}_{Rate(value, class)} = \frac{1}{1 + \exp(Y * BD_{value} + Y)}$$

In this equation, confidence rate of a given value to a class is computed where $BD_{value}$ represents a distance of selected value to a class. Y is a fixed value that may be optimized in this equation. Some additional details of the confidence expression may be found at Platt, John. "Probabilistic outputs for support vector machines and comparisons to regularized likelihood methods." *Advances In Large Margin Classifiers* 10.3 (1999): 61-74, which is incorporated herein by reference in its entirety.

The risk calculation module 504 may be configured to calculate risk of the solution 317. The risk may be calculated at least partially using data from the ticket DB 128 and the RTS-DB 131 (e.g., the ticket DB data 211/217 and the RTS-DB data 213/219). For example, the risk may be calculated according to a risk expression:

$$\text{Risk(value, class)} = \frac{\text{Confidence}_{Rate(value, class)}}{100} * \text{impact}$$

In the risk expression, impact shows the effect of decision. Confidence is consistent with the expression above.

The confidence calculation module 502 may be configured to compare the calculated risk to a risk threshold. Additionally or alternatively, the confidence calculation module 502 may be configured to compare the calculated confidence to a confidence threshold. Responsive to the calculated risk being above a risk threshold and the calculated confidence be above a confidence threshold, the solution 317 may be implemented automatically without action by a human. For example, the solution 317 may be communicated to the computing system 115. The solution 317 may be automatically implemented at the computing system 115 to resolve an issue in a ticket submitted by the computing system 115.

Responsive to the computed risk being below the risk threshold and the calculated confidence be below the confidence threshold, the solution 317 may be communicated to a human-assisted resolution module (assisted module) 508. The assisted module 508 may be associated with or controlled by the human representative 510. The human representative 510 may then communicate the solution 317 to the computing system 115. Implementation of the solution 317 may then be implemented at least partially through an action of the human representative 510 or under a direction of the human representative 510. For example, the human representative 510 may oversee implementation of the set of directions 306 at the computing system 115. Additionally or alternatively, the human representative 510 may perform one or more actions to implement the set of directions 306.

The classifier models 209 and/or the solution models 215 may be retrained following implementation of the solution 317. For example, the solution 317 and the problem statement 311 (shown in FIG. 3) may be used to train the classifier models 209 and/or the solution models 215. The solution 317 and the problem statement 311 may represent new data or records that may train and/or test the classifier models 209 and/or the solution models 215 similar to the training and testing using the TDB data 211/217 and RTS-DB data 213/219 as described elsewhere in the present disclosure.

FIG. 6 depicts example data 600 that may be implemented in the operating system 100 of FIG. 1. The data 600 of FIG. 6 may be a portion of the data accessed from a ticket DB and/or a RTS-DB such as the ticket DB 128 and the RTS-DB 131. For example, the data 600 may be used to train and to test machine-learning-based models. In the embodiment of FIG. 6, the data 600 is organized in a spreadsheet. In other embodiments, the data 600 may be organized in another suitable machine-readable record.

The data 600 may be organized into multiple columns (602, 604, 606, 608, 610, 612, and 614). Information in a first column 602 may be used for identification purposes. For instance, the 'ID' of FIG. 6 may be an indexing number (e.g., alpha-numeric, numeric, etc.) assigned to a ticket. A second column 604 may indicate whether the issue was resolved. In the second column 604, the status is 'closed." In other data 600, other statuses may include open, pending, and the like. A third column 606 and the fourth column 608 may be a summary and a description, respectively. The summary and the description may include text that describes the issue, which may be used in training and testing machine-learning-based models. The fifth column 610, a sixth column 612, and a seventh column 614 may be representative of one of the features of a computing system that are implicated by or related to the issue of a ticket. For example, a ticket indexed as 0010 may have a type that is a 'service-type,' may have a medium priority, and may be associate with a module of a computing system that is called 'internal comm. module.'

The data 600 may be used during training and/or testing of the machine-learning-based models. For instance, based on the data 600, relationships between the text in the third and fourth columns 606 and 608 and the features of the columns 610, 612, and 614 may be ascertained. This and other relationships in the data 600 may act as data sets that are used to train the machine-learning-based models.

Figure 7:
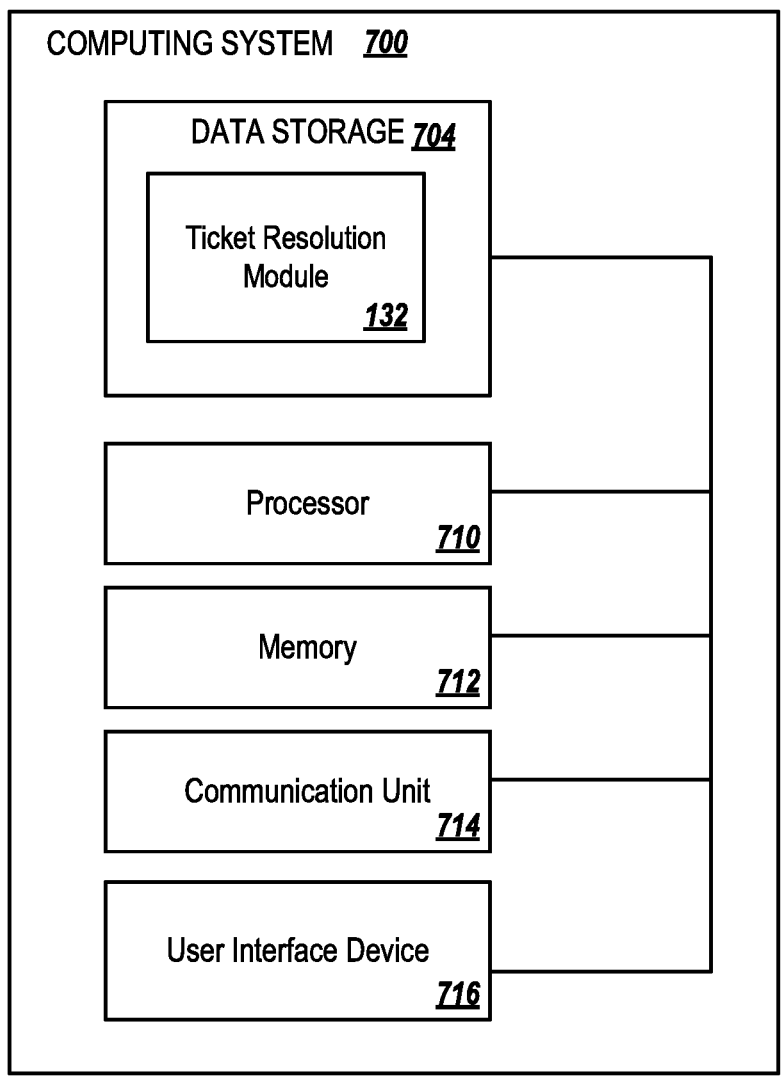
FIG. 7 is a block diagram of an example computing system that is configured for automated ticket resolution.

FIG. 7 illustrates an example computing system 700 configured for automated ticket resolution according to at least one embodiment of the present disclosure. The computing system 700 may be implemented in the operating environment 100 of FIG. 1, for instance. Examples of the computing system 700 may include the automated ticket resolution system 110. The computing system 700 may include one or more processors 710, a memory 712, a communication unit 714, a user interface device 716, and a data storage 704 that includes the ticket resolution module 132.

The processor 710 may include any suitable special-purpose or general-purpose computer, computing entity, or processing device including various computer hardware or software modules and may be configured to execute instructions stored on any applicable computer-readable storage media. For example, the processor 710 may include a microprocessor, a microcontroller, a digital signal processor (DSP), an ASIC, an FPGA, or any other digital or analog circuitry configured to interpret and/or to execute program instructions and/or to process data.

Although illustrated as a single processor in FIG. 7, the processor 710 may more generally include any number of processors configured to perform individually or collectively any number of operations described in the present disclosure. Additionally, one or more of the processors 710 may be present on one or more different electronic devices or computing systems. In some embodiments, the processor 710 may interpret and/or execute program instructions and/or process data stored in the memory 712, the data storage 704, or the memory 712 and the data storage 704. In some embodiments, the processor 710 may fetch program instructions from the data storage 704 and load the program instructions in the memory 712. After the program instructions are loaded into the memory 712, the processor 710 may execute the program instructions.

The memory 712 and the data storage 704 may include computer-readable storage media for carrying or having computer-executable instructions or data structures stored thereon. Such computer-readable storage media may include any available media that may be accessed by a general-purpose or special-purpose computer, such as the processor 710. By way of example, and not limitation, such computer-readable storage media may include tangible or non-transitory computer-readable storage media including RAM, ROM, EEPROM, CD-ROM or other optical disk storage, magnetic disk storage or other magnetic storage devices, flash memory devices (e.g., solid state memory devices), or any other storage medium which may be used to carry or store desired program code in the form of computer-executable instructions or data structures and that may be accessed by a general-purpose or special-purpose computer. Combinations of the above may also be included within the scope of computer-readable storage media. Computer-executable instructions may include, for example, instructions and data configured to cause the processor 710 to perform a certain operation or group of operations.

The communication unit 714 may include one or more pieces of hardware configured to receive and send communications. In some embodiments, the communication unit 714 may include one or more of an antenna, a wired port, and modulation/demodulation hardware, among other communication hardware devices. In particular, the communication unit 714 may be configured to receive a communication from outside the computing system 700 and to present the communication to the processor 710 or to send a communication from the processor 710 to another device or network (e.g., 124 of FIG. 1).

The user interface device 716 may include one or more pieces of hardware configured to receive input from and/or provide output to a user. In some embodiments, the user interface device 716 may include one or more of a speaker, a microphone, a display, a keyboard, a touch screen, or a holographic projection, among other hardware devices.

The ticket resolution module 132 may include program instructions stored in the data storage 704. The processor 710 may be configured to load the ticket resolution module 132 into the memory 712 and execute the ticket resolution module 132. Alternatively, the processor 710 may execute the ticket resolution module 132 line-by-line from the data storage 704 without loading them into the memory 712. When executing the ticket resolution module 132 the processor 710 may be configured to perform a participation verification process as described elsewhere in this disclosure.

Modifications, additions, or omissions may be made to the computing system 700 without departing from the scope of the present disclosure. For example, in some embodiments, the computing system 700 may not include the user interface device 716. In some embodiments, the different components of the computing system 700 may be physically separate and may be communicatively coupled via any suitable mechanism. For example, the data storage 704 may be part of a storage device that is separate from a server, which includes the processor 710, the memory 712, and the communication unit 714, that is communicatively coupled to the storage device. The embodiments described herein may include the use of a special-purpose or general-purpose computer including various computer hardware or software modules, as discussed in greater detail below.

Figure 8A:
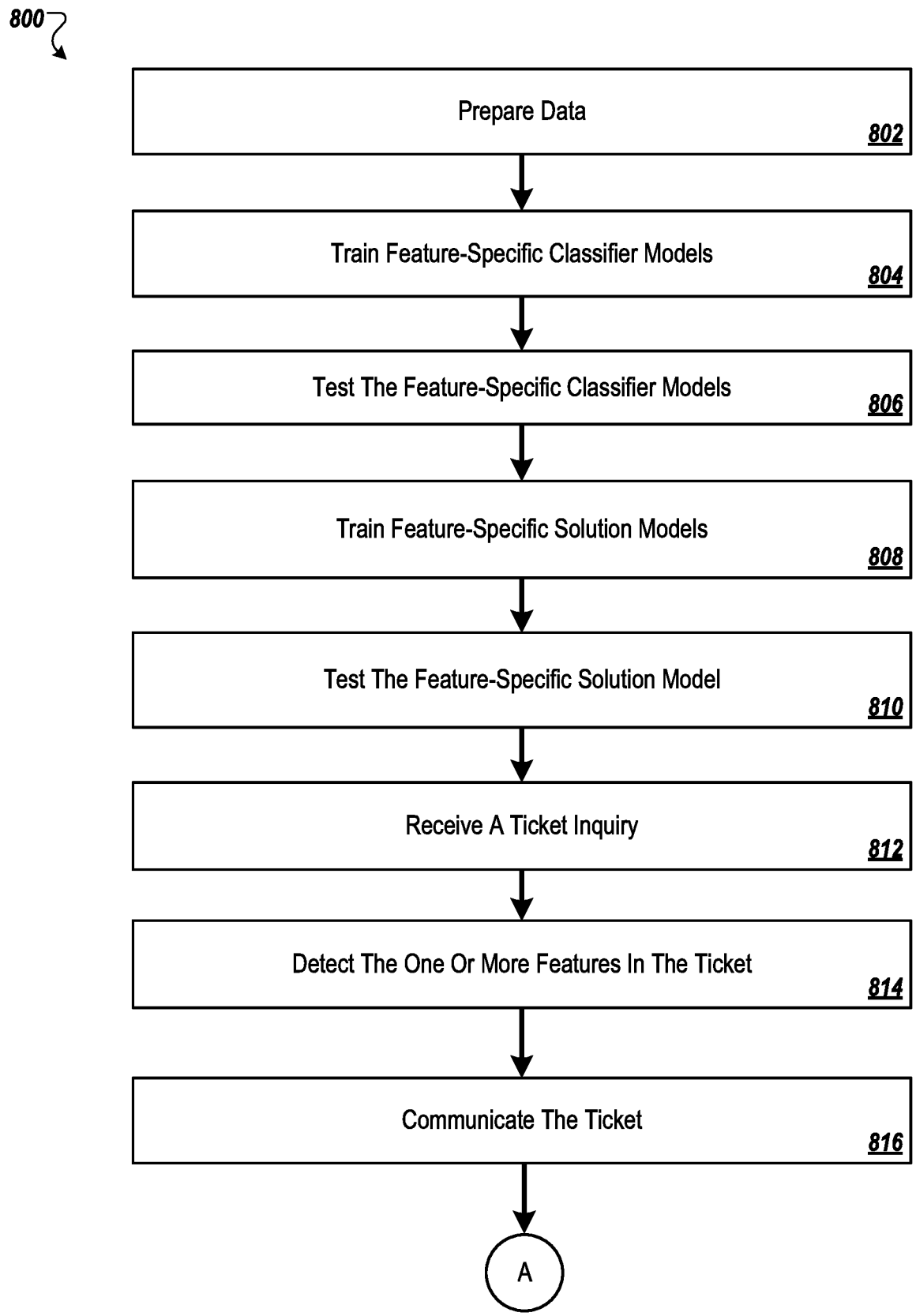
FIGS. 8A and 8B are a flow chart of an example method automated ticket resolution, all according to at least one embodiment described in the present disclosure.
Figure 8B:
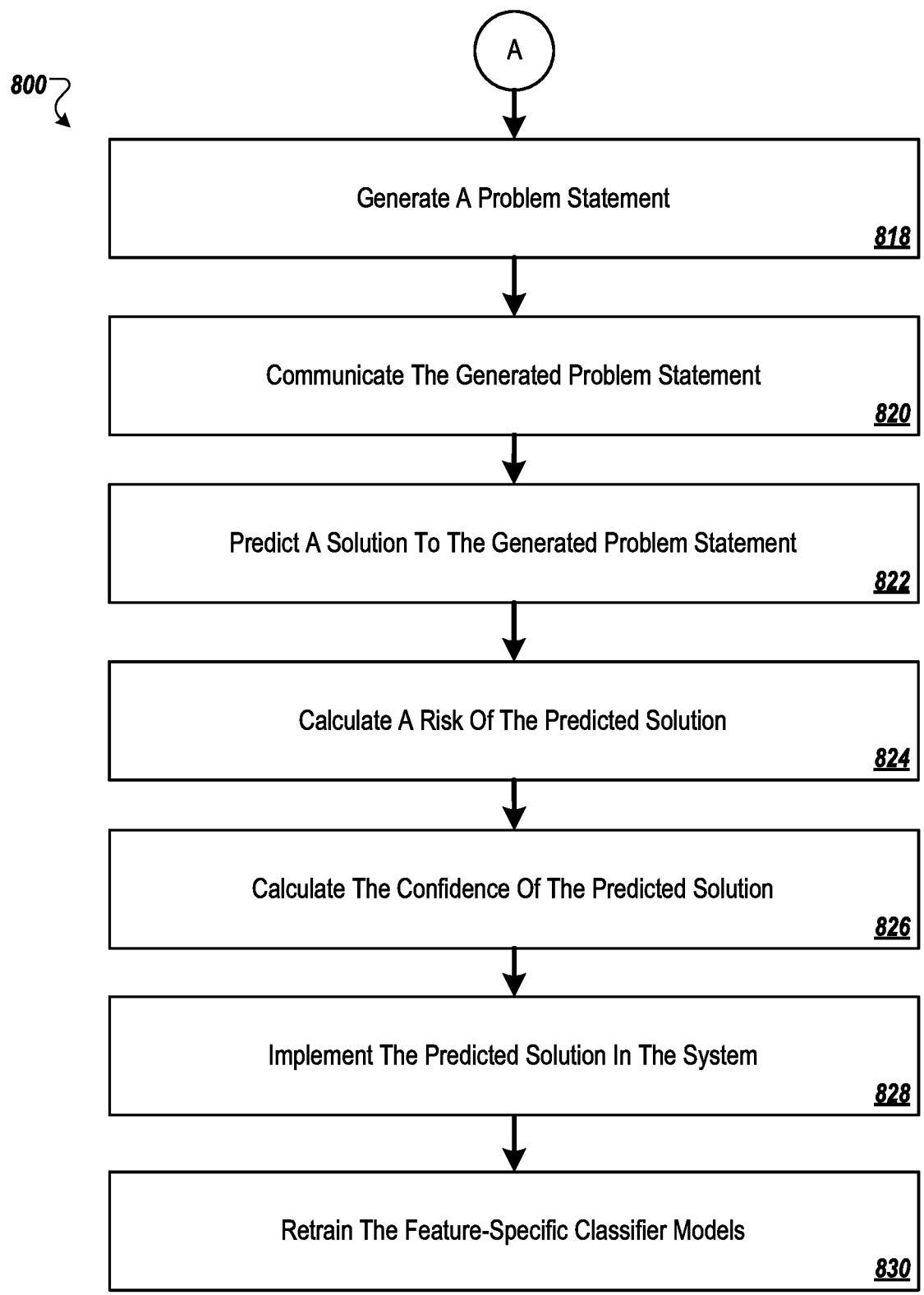

FIGS. 8A and 8B is a flowchart of an example method 800 of automated ticket resolution according to at least one embodiment of the present disclosure. The method 800 may be performed in an operating environment such as the operating environment 100 of FIG. 1. The method 800 may be programmably performed in some embodiments by the ticket resolution system 110 described with reference to FIG. 1. In some embodiments, the automated ticket resolution system 110 or another computing system may include or may be communicatively coupled to a non-transitory computer-readable medium (e.g., the memory 712 of FIG. 7) having stored thereon programming code or instructions that are executable by one or more processors (such as the processor 710 of FIG. 7) to cause a computing system and/or the ticket resolution system 110 to perform or control performance of the method 800. Additionally or alternatively, the ticket resolution system 110 may include the processor 710 described elsewhere in this disclosure that is configured to execute computer instructions to cause the ticket resolution system 110 or another computing system to perform or control performance of the method 800. Although illustrated as discrete blocks, various blocks in FIG. 8 may be divided into additional blocks, combined into fewer blocks, or eliminated, depending on the desired implementation.

The method 800 may begin at block 802, in which data may be prepared. For example, ticket DB data and/or resolved ticket solution database data may be prepared such that the prepared data may be used to train and/or test models. In some embodiments, a first portion of ticket DB data may be prepared prior to training feature-specific classifier models. The preparing data may include one or more steps. For instance, the preparing data may include extracting text from the data, cleaning the data by removing stop words and changing characters to lower case. A set of word that is important to the data may be generated using frequency-inverse document frequency (TFIDF) or another suitable numerical statistic.

At block 804, feature-specific classifier models may be trained. The classifier models may be trained using a first portion of ticket DB data. The classifier models may include two or more machine-learning-based classification models that are related to one or more features of a system. The ticket DB data may include classification information from a managed customer service department related to the system that is collected by one or more customer service agents in response to manually entered tickets. The classification information may include customer information, billing information, problem information issued as a ticket, affected area information, reporter person information, ticket log information, timestamp information, other detail information related to the problem information, attachments related to tickets, or combinations thereof. In some embodiments, the features may include a priority, a module, an assignment, an assigned group, an affected area, or some combination thereof.

At block 806, the feature-specific classifier models may be tested using a second portion of the ticket DB data. In some embodiments, the first portion of the ticket DB data may be about 50%, about 60%, about 70%, about 80% or another suitable percentage of a total amount of the ticket DB data. Correspondingly, the second portion of the ticket DB data may be about 70%, about 75%, about 80%, about 85% or another suitable percentage of the total amount of the ticket DB data.

At block 808, feature-specific solution models may be trained. The feature-specific solution models may be trained using a first portion of the resolved ticket solution database data. The feature-specific classifier models may include two or more machine-learning-based solution models that are related to one or more features of the system. The resolved ticket solution database data may include solution information from the managed customer service department. The solution information may include solutions to records in a ticket DB. For instance, the resolved ticket solution database data may include solution information from the ticket DB from which the ticket DB data may be stored and/or accessed.

At block 810, the feature-specific solution models may be tested. The feature-specific solution models may be tested using a second portion of the resolved ticket solution database data. In some embodiments, the first portion of the resolved ticket solution database data may be about 70%, about 75%, about 80%, about 85% or another suitable percentage of a total amount of the ticket DB data. Correspondingly, the second portion of the resolved ticket solution database data may be about 30%, about 25%, about 20%, about 15% or another suitable percentage of the total amount of the ticket DB data.

At block 812, a ticket inquiry may be received. The ticket inquiry may include a ticket. The ticket may be indicative of an issue in the system. The ticket may be related to one or more of the features. The ticket inquiry may be received directly from a live user ticket interface. Additionally or alternatively, the ticket inquiry may be received from a live user ticket interface via an API such as a REST API. At block 814, the features may be detected in the ticket. At block 816, the ticket may be communicated to one or more of the feature-specific classifier models. For instance, the ticket may be communicate to the feature-specific classifier models that correspond to the detected features of the ticket.

At block 818, a problem statement may be generated. The problem statement may be generated that is representative of the ticket inquiry and/or the issue therein. The problem statement may be generated using the tested feature-specific classifier models. The problem statement may be associated with the one or more features of the ticket inquiry. At block 820, the generated problem statement may be communicated to the feature-specific solution models. At block 822, a solution to the generated problem statement may be predicted. The solution to the generated problem statement may be predicted using the feature-specific solution models. The predicted solution may include a set of directions to resolve the ticket. Additionally, the predicted solution may include one or more certainty characteristics of the predicted solution. The certainty characteristics may include risk and/or confidence in some embodiments.

At block 824, the risk of the predicted solution may be calculated. The risk of the predicted solution may be calculated based on the ticket DB data and/or the resolved ticket solution database data. At block 826, the confidence of the predicted solution may be calculated. The confidence of the predicted solution may be calculated based on the ticket DB data and the resolved ticket solution database data.

At block 828, the predicted solution may be implemented in the system. The predicted solution may be implemented in the system to resolve the issue in the system. Implementation of the predicted solution may be at least partially based on the certainty characteristics. For instance, in some embodiments, responsive to the predicted solution being below a risk threshold, the predicted solution is automatically implemented to resolve the issue. In some embodiments in which the certainty characteristics include risk and confidence, responsive to the calculated risk being above a risk threshold and the calculated confidence be above a confidence threshold, the predicted solution may be implemented automatically without action by a human. Additionally, in these and other embodiments, responsive to the calculated risk being below the risk threshold and the calculated confidence be below the confidence threshold, the predicted solution may be implemented at least partially through an action of a human or under a direction of the human.

At block 830, the feature-specific classifier models may be retrained. In some embodiments, the feature-specific classifier models may be retrained using the predicted solution and/or the generated problem statement. For instance, the predicted solution and/or the generated problem statement may be used to train and/or test the feature-specific classifier models. In addition, in some embodiments, the feature-specific solution model may be retrained. For instance, the feature-specific solution models may be retrained and/or retested using the predicted solution and/or the generated problem statement. Following the retraining, the method 800 may proceed to one or more of blocks 806, 810, 814, 816, 818, 820, 822, 824, 826, 828, 830, or combinations thereof.

One skilled in the art will appreciate that, for this and other procedures and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the disclosed embodiments.

The embodiments described herein may include the use of a special purpose or general purpose computer including various computer hardware or software modules, as discussed in greater detail below.

Embodiments described herein may be implemented using computer-readable media for carrying or having computer-executable instructions or data structures stored thereon. Such computer-readable media may be any available media that may be accessed by a general purpose or special purpose computer. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to carry or store desired program code in the form of computer-executable instructions or data structures and which may be accessed by a general purpose or special purpose computer. Combinations of the above may also be included within the scope of computer-readable media.

Computer-executable instructions may include, for example, instructions and data, which cause a general purpose computer, special purpose computer, or special purpose processing device (e.g., one or more processors) to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the terms "module" or "component" may refer to specific hardware implementations configured to perform the operations of the module or component and/or software objects or software routines that may be stored on and/or executed by general purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present inventions have been described in detail, it should be understood that the various changes, substitutions, and alterations could be made hereto without departing from the spirit and scope of the invention.

What is claimed is:

1. A method of automated ticket resolution, the method comprising:

training feature-specific classifier models using a first portion of ticket database records, the feature-specific classifier models including two or more machine-learning based classification models that are each related to a different respective feature of a plurality of features of a system;

testing the feature-specific classifier models using a second portion of the ticket database records;

training feature-specific solution models using a first portion of resolved ticket solution database data, the feature-specific classifier models including two or more machine-learning based solution models that are each related to one feature of the plurality of features of the system;

testing the feature-specific solution model using a second portion of the resolved ticket solution database data;

receiving a ticket inquiry, the ticket inquiry including a ticket that is indicative of an issue in the system and that is related to one or more features of the plurality of features;

providing the ticket to one or more tested feature-specific classifier models that each respectively correspond to a respective feature of the one or more features of the system that are associated with the ticket;

generating a problem statement representative of the issue using the one or more tested feature-specific classifier models, the problem statement being associated with the one or more features associated with the ticket;

communicating the generated problem statement to the feature-specific solution models;

predicting a solution to the generated problem statement using the feature-specific solution models, the predicted solution including a set of directions to resolve the ticket and one or more certainty characteristics of the predicted solution; and based on the certainty characteristics, implementing the predicted solution in the system to resolve the issue.

2. The method of claim 1, wherein:
the ticket inquiry is received directly from a live user ticket interface; or
the ticket inquiry is received from a live user ticket interface via an application programming interface (API).

3. The method of claim 1, further comprising preparing the first portion of ticket database records prior to training the feature-specific classifier model.

4. The method of claim 1, further comprising calculating a risk of the predicted solution, wherein responsive to the predicted solution being above a risk threshold, the predicted solution is automatically implemented to resolve the issue.

5. The method of claim 1, wherein:
the ticket database records includes classification information from a managed customer service department related to the system that is collected by one or more customer service agents in response to manually entered tickets, the classification information including one or more or a combination of customer information, billing information, problem information issued as a ticket, affected area information, reporter person information, ticket log information, timestamp information, other detail information related to the problem information, and attachments related to tickets; and
the resolved ticket solution database data includes solution information from the managed customer service department, the solution information including solutions to records in a ticket database.

6. The method of claim 1, wherein:
the certainty characteristics include risk and confidence;
the method further comprises calculating the risk of the predicted solution and the confidence of the predicted solution based on the ticket database records and the resolved ticket solution database data;
responsive to the calculated risk being above a risk threshold and the calculated confidence being above a confidence threshold, the predicted solution is implemented automatically without action by a human; and
responsive to the calculated risk being below the risk threshold and the calculated confidence being below the confidence threshold, the predicted solution is implemented at least partially through an action of a human or under a direction of the human.

7. The method of claim 1, further comprising retraining the feature-specific classifier models using the predicted solution and the generated problem statement.

8. The method of claim 1, further comprising:
detecting the one or more features in the ticket; and
communicating the ticket to one of the feature-specific classifier models that correspond to the detected features of the ticket.

9. The method of claim 1, wherein:
the first portion of the ticket database records is about 70% of a total amount of the ticket database records; and
the second portion of the ticket database records is about 30% of a total amount of the ticket database records.

10. The method of claim 1, wherein the plurality of features includes one or more or a combination of a priority, a module, an assignment, an assigned group, and an affected area.

11. A non-transitory computer-readable medium having encoded therein programming code executable by one or more processors to perform or control performance of operations comprising:
training feature-specific classifier models using a first portion of ticket database records, the feature-specific classifier models including two or more machine-learning based classification models that are each related to a different respective feature of a plurality of features of a system;
testing the feature-specific classifier models using a second portion of the ticket database records;
training feature-specific solution models using a first portion of resolved ticket solution database data, the feature-specific classifier models including two or more machine-learning based solution models that are each related to one feature of the plurality of features of the system;
testing the feature-specific solution model using a second portion of the resolved ticket solution database data;
receiving a ticket inquiry, the ticket inquiry including a ticket that is indicative of an issue in the system and that is related to one or more features of the plurality of features;
providing the ticket to one or more tested feature-specific classifier models that each respectively correspond to a respective feature of the one or more features of the system that are associated with the ticket;
generating a problem statement representative of the issue using the one or more tested feature-specific classifier models, the problem statement being associated with the one or more features associated with the ticket;
communicating the generated problem statement to the feature-specific solution models;
predicting a solution to the generated problem statement using the feature-specific solution models, the predicted solution including a set of directions to resolve the ticket and one or more certainty characteristics of the predicted solution; and
based on the certainty characteristics, implementing the predicted solution in the system to resolve the issue.

12. The non-transitory computer-readable medium of claim 11, wherein:
the ticket inquiry is received directly from a live user ticket interface; or
the ticket inquiry is received from a live user ticket interface via an application programming interface (API).

13. The non-transitory computer-readable medium of claim 11, wherein the operations further comprise preparing the first portion of ticket database records prior to training the feature-specific classifier model.

14. The non-transitory computer-readable medium of claim 11, wherein:
the operations further comprise calculating a risk of the predicted solution; and responsive to the predicted solution being above a risk threshold, the predicted solution is automatically implemented to resolve the issue.

15. The non-transitory computer-readable medium of claim 11, wherein:
the ticket database records includes classification information from a managed customer service department related to the system that is collected by one or more customer service agents in response to manually entered tickets, the classification information including one or more or a combination of customer information, billing information, problem information issued as a ticket, affected area information, reporter person information, ticket log information, timestamp information, other detail information related to the problem information, and attachments related to tickets; and
the resolved ticket solution database data includes solution information from the managed customer service department, the solution information including solutions to records in a ticket database.

16. The non-transitory computer-readable medium of claim 11, wherein:
the certainty characteristics include risk and confidence;
the operations further comprise calculating the risk of the predicted solution and the confidence of the predicted solution based on the ticket database records and the resolved ticket solution database data;
responsive to the calculated risk being above a risk threshold and the calculated confidence being above a confidence threshold, the predicted solution is implemented automatically without action by a human; and
responsive to the calculated risk being below the risk threshold and the calculated confidence being below the confidence threshold, the predicted solution is implemented at least partially through an action of a human or under a direction of the human.

17. The non-transitory computer-readable medium of claim 11, wherein the operations further comprise retraining the feature-specific classifier models using the predicted solution and the generated problem statement.

18. The non-transitory computer-readable medium of claim 11, wherein the operations further comprise:
detecting the one or more features in the ticket; and
communicating the ticket to one of the feature-specific classifier models that correspond to the detected features of the ticket.

19. The non-transitory computer-readable medium of claim 11, wherein:
the first portion of the ticket database records is about 70% of a total amount of the ticket database records; and
the second portion of the ticket database records is about 30% of a total amount of the ticket database records.

20. The non-transitory computer-readable medium of claim 11, wherein the plurality of features includes one or more or a combination of a priority, a module, an assignment, an assigned group, and an affected area.

* * * * *